United States Patent
Rizvi et al.

(10) Patent No.: US 10,187,447 B1
(45) Date of Patent: Jan. 22, 2019

(54) METHOD AND SYSTEM FOR ONLINE CONVERSION ATTRIBUTION

(71) Applicant: Twitter, Inc., San Francisco, CA (US)

(72) Inventors: Shariq Rizvi, Mountain View, CA (US); Ameet Ranadive, San Francisco, CA (US); Abhishek Shrivastava, Santa Clara, CA (US); Wenchang Zhou, San Francisco, CA (US); Bill Darrow, San Francisco, CA (US); Santosh Kancha, Pleasanton, CA (US); Travis Lull, San Francisco, CA (US); Tom Larson, San Francisco, CA (US); Yimin Wu, Seattle, WA (US); Xiaochuan Qin, Issaquah, WA (US)

(73) Assignee: Twitter, Inc., San Francisco, CA (US)

( * ) Notice: Subject to any disclaimer, the term of this patent is extended or adjusted under 35 U.S.C. 154(b) by 213 days.

(21) Appl. No.: 15/009,709

(22) Filed: Jan. 28, 2016

(51) Int. Cl.
*H04L 29/08* (2006.01)
*H04L 29/12* (2006.01)

(52) U.S. Cl.
CPC .......... *H04L 67/02* (2013.01); *H04L 61/2007* (2013.01)

(58) Field of Classification Search
CPC ..... H04L 67/02; H04L 67/322; H04L 67/327; H04L 61/2007; H04L 51/38; G06F 17/30887; G06F 17/30864; G06F 17/30876; G06F 17/30014
See application file for complete search history.

(56) References Cited

U.S. PATENT DOCUMENTS

| | | | | |
|---|---|---|---|---|
| 7,698,269 | B2* | 4/2010 | Zhou | G06F 17/30887 707/999.006 |
| 8,630,200 | B2* | 1/2014 | St. Jean | G06F 17/30887 370/252 |
| 8,661,161 | B2* | 2/2014 | Zhang | G06F 17/30876 709/206 |
| 9,268,750 | B2* | 2/2016 | Mishra | G06F 17/30014 |
| 9,411,900 | B2* | 8/2016 | Vishria | G06F 17/30887 |
| 9,477,771 | B2* | 10/2016 | Aoki | G06F 17/30887 |
| 2002/0107986 | A1* | 8/2002 | Pfohe | H04L 29/12009 709/246 |
| 2003/0097297 | A1* | 5/2003 | Cavarretta | G06Q 10/1053 705/14.36 |
| 2007/0124500 | A1* | 5/2007 | Bedingfield, Sr. | G06F 17/30887 709/245 |
| 2007/0136279 | A1* | 6/2007 | Zhou | G06F 17/30887 |
| 2008/0235351 | A1* | 9/2008 | Banga | G06Q 30/02 709/218 |
| 2009/0100099 | A1* | 4/2009 | Buckwalter | G06F 17/30702 |

(Continued)

*Primary Examiner* — Michael A Keller
(74) *Attorney, Agent, or Firm* — Shumaker & Sieffert, P.A.

(57) ABSTRACT

A system for online conversion attribution. The system includes a short uniform resource locator (URL) service programmed to, in response to receiving a short URL from a device: provide a cookie that includes a short URL ID to the device, and provide a short URL descriptor including the short URL ID to a user mapping service. The system further includes the user mapping service programmed to receive the short URL descriptor, receive a social media descriptor including a social media ID, map the short URL ID to the social media ID using the short URL descriptor and the social media descriptor, and attribute, using the mapping, a conversion on a website accessed using the device based upon receipt of the short URL ID from the device.

20 Claims, 9 Drawing Sheets

(56) References Cited

U.S. PATENT DOCUMENTS

| | | | |
|---|---|---|---|
| 2011/0289434 A1* | 11/2011 | Kieft | G06F 17/30887 715/760 |
| 2011/0295990 A1* | 12/2011 | St. Jean | G06F 17/30887 709/223 |
| 2012/0060108 A1* | 3/2012 | Domartini | G06Q 20/1235 715/768 |
| 2012/0203929 A1* | 8/2012 | Patalsky | G06F 17/30887 709/245 |
| 2012/0316941 A1* | 12/2012 | Moshfeghi | G06Q 30/02 705/14.16 |
| 2013/0159233 A1* | 6/2013 | Mason | G06F 17/30864 706/45 |
| 2013/0218652 A1* | 8/2013 | Fargo | G06Q 30/02 705/14.16 |
| 2013/0227662 A1* | 8/2013 | Crampton | H04L 63/10 726/6 |
| 2013/0282592 A1* | 10/2013 | Zambrana | G06Q 30/012 705/302 |
| 2013/0290821 A1* | 10/2013 | Pollack | G06F 17/30887 715/208 |
| 2014/0129733 A1* | 5/2014 | Klais | H04L 67/327 709/239 |
| 2014/0156407 A1* | 6/2014 | Dinardo, Sr. | H04W 4/206 705/14.56 |
| 2014/0372325 A1* | 12/2014 | Zambrana | G06Q 30/012 705/302 |
| 2015/0025981 A1* | 1/2015 | Zaretsky | G06F 17/30887 705/14.73 |
| 2015/0332365 A1* | 11/2015 | Kassemi | H04L 51/38 705/26.41 |
| 2015/0370899 A1* | 12/2015 | Jung | G06F 17/30864 707/722 |
| 2016/0267060 A1* | 9/2016 | Skirpa | G06F 3/0481 |
| 2016/0277315 A1* | 9/2016 | Miller | H04L 67/322 |
| 2016/0308936 A1* | 10/2016 | Yuan | H04L 63/10 |
| 2017/0034013 A1* | 2/2017 | Cherian | G06F 17/30861 |
| 2017/0178223 A1* | 6/2017 | Ranasinghe | G06Q 30/0633 |
| 2017/0289350 A1* | 10/2017 | Philbin | H04M 3/5116 |

* cited by examiner ical Patent
METHOD AND SYSTEM FOR ONLINE CONVERSION ATTRIBUTION

CROSS-REFERENCE TO RELATED APPLICATIONS

This application claims priority to U.S. Provisional Patent Application No. 62/108,909 filed Jan. 28, 2015, the entire disclosure of which is hereby expressly incorporated by reference herein.

BACKGROUND

In order to determine the effectiveness of online advertising campaigns, companies have traditionally used cookies. Cookies were originally designed to be used on web browsers executing on desktop systems. With the increased use of mobile devices (e.g., smart phones, etc.), advertisers are interested in understanding and tracking the effectiveness of advertising campaigns for mobile device users. However, by default, may of the mobile devices do not enable and/or permit the use of cookies in the same manner as these cookies have traditionally been used on web browsers executing on desktop systems. Accordingly, additional steps may need to be performed in order to use cookies on mobile devices.

SUMMARY

Embodiments of the technology enable online conversion attribution. Specifically, online conversion may be identified in systems where a user interacts with, for example, a social media network using an application executing on a portable device. Even though the application may not support cookies, conversion attribution may be performed successfully, based on the matching of various identifiers that enable the reconstruction of an identity and subsequently, attribution of the conversion to the social media network, based on the reconstructed identity.

In one embodiment of the invention, a short URL (uniform resource locator) service is used to generate and place cookies on mobile devices where the cookies include a short URL ID. Further, the short URL service and the social media network server obtain and provide information to a user mapping service. The user mapping service subsequently generates a mapping between a social media ID of a user and the short URL ID.

The above mapping, in accordance with an embodiment of the invention, enables the connection between the user having selected the advertisement, and the subsequently completed purchase. Thus, the purchase (or other activities) may be attributed, with confidence, to a particular user on a particular social network.

In scenarios in which a short URL is more suitable than a long URL (e.g., the latter does not fit due to size restrictions or consumes too much display space within an advertisement), a short URL service may be used to generate a short URL that fits into the advertisement. Once the short URL is included within an advertisement, the effectiveness of the advertisement may be determined in accordance with one or more embodiments of the invention.

In general, in one aspect, the invention relates to a system, the system including a short uniform resource locator (URL) service programmed to, in response to receiving a short URL from a device: provide a cookie that includes a short URL ID to the device, and provide a short URL descriptor including the short URL ID to a user mapping service. The system further includes the user mapping service programmed to receive the short URL descriptor, receive a social media descriptor including a social media ID, map the short URL ID to the social media ID using the short URL descriptor and the social media descriptor, and attribute, using the mapping, a conversion on a website accessed using the device based upon receipt of the short URL ID from the device.

In general, in one aspect, the invention relates to a method for conversion attribution, including obtaining a social media descriptor including a social media ID associated with a user, a short uniform resource locator (URL) address, a first timestamp and an Internet Protocol (IP) address of a device; obtaining a short URL descriptor including a short URL ID, the short URL address, the IP address of the device, and a second timestamp; generating, using the social media descriptor and the short URL descriptor, a mapping between the short URL ID and the social media ID; and attributing, using the mapping, a conversion on a website of a partner when the user associated with the short URL ID accesses the website within a predetermined period of time after viewing an advertisement on the device.

In general, in one aspect, the invention relates to a non-transitory computer readable medium comprising instructions for performing a method, the method comprising obtaining a social media descriptor including a social media ID associated with a user, a short uniform resource locator (URL) address, a first timestamp and an Internet Protocol (IP) address of a device; obtaining a short URL descriptor including a short URL ID, the short URL address, the IP address of the device, and a second timestamp; generating, using the social media descriptor and the short URL descriptor, a mapping between the short URL ID and the social media ID; and attributing, using the mapping, a conversion on a website of a partner when the user associated with the short URL ID accesses the website within a predetermined period of time after viewing an advertisement on the device.

DETAILED DESCRIPTION

Figure 1A:
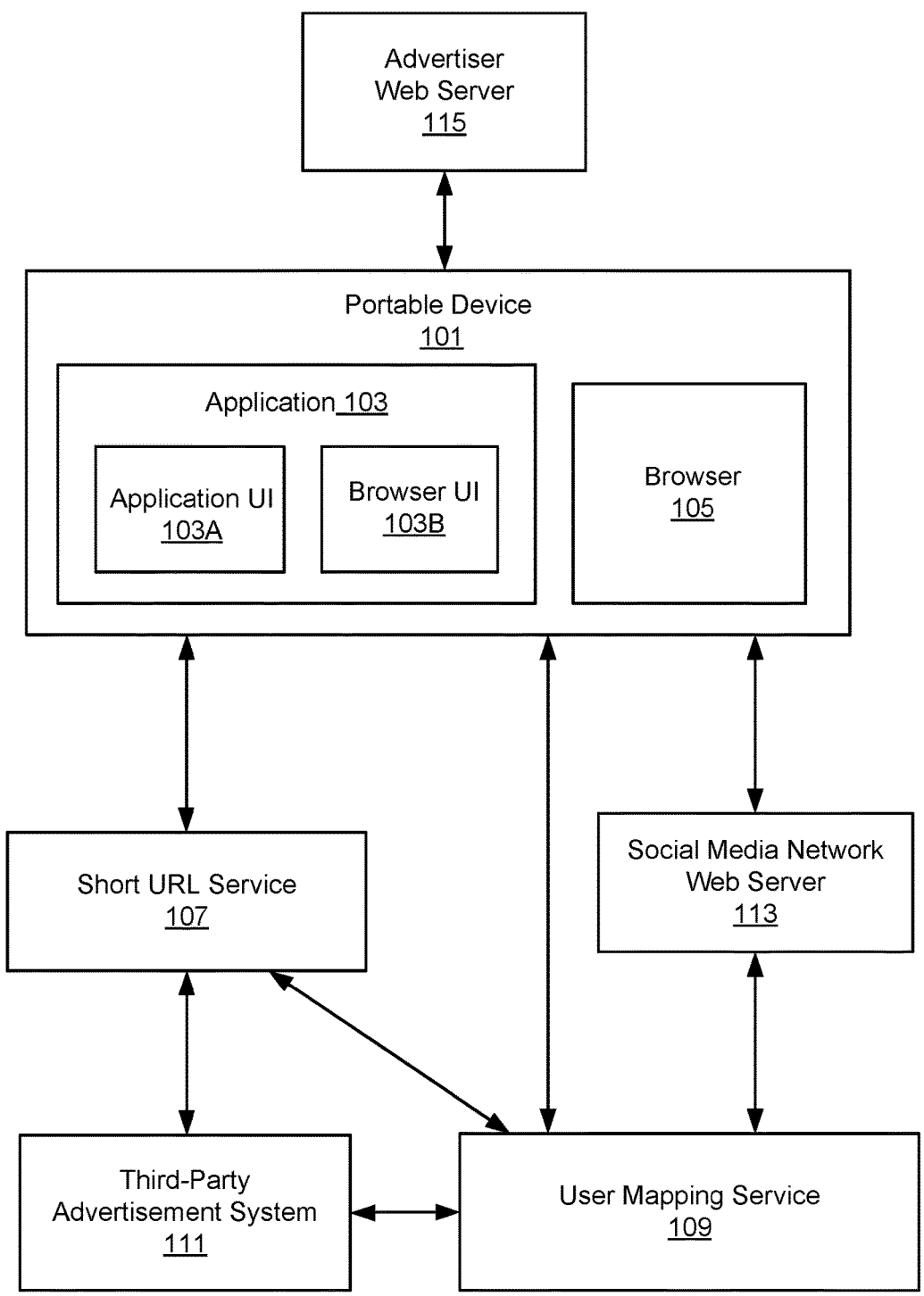
FIG. 1A shows a system in accordance with one or more embodiments of the invention.

Specific embodiments of the technology will now be described in detail with reference to the accompanying figures. Like elements in the various figures are denoted by like reference numerals for consistency.

In the following detailed description of embodiments of the technology, numerous specific details are set forth in order to provide a more thorough understanding of the technology. However, it will be apparent to one of ordinary skill in the art that the technology may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention relate to methods for attributing an online conversion. For example, embodiments of the invention enable attributing an online conversion to a platform (e.g. a social media platform) that displays an advertisement, thereby providing a quantifiable measure to the effectiveness of the advertisement on the platform. More specifically, one or more embodiments of the invention enable the attribution of online conversions in systems where user access the platform using applications executing on portable devices, e.g. smartphones and or tablet applications executing on a smartphone and/or tablet computer, respectively. In one embodiment of the invention, the attribution is enabled by determining a correspondence between a social media ID, e.g., the login name of the social media account, and a short URL ID affiliated with a completed conversion. Based on this correspondence, a causal relationship between the user having viewed an advertisement and the subsequent conversion may be established.

FIG. 1A shows a system in accordance with one or more embodiments of the invention. As shown in FIG. 1A, the system has multiple components including at least one portable device (101), a short Uniform Resource Locator (URL) service (107), a user mapping service (109), a third-party advertisement system (111), a social media network web server (113), and an advertiser web server (115). Each of these components is described below.

Figure 2:
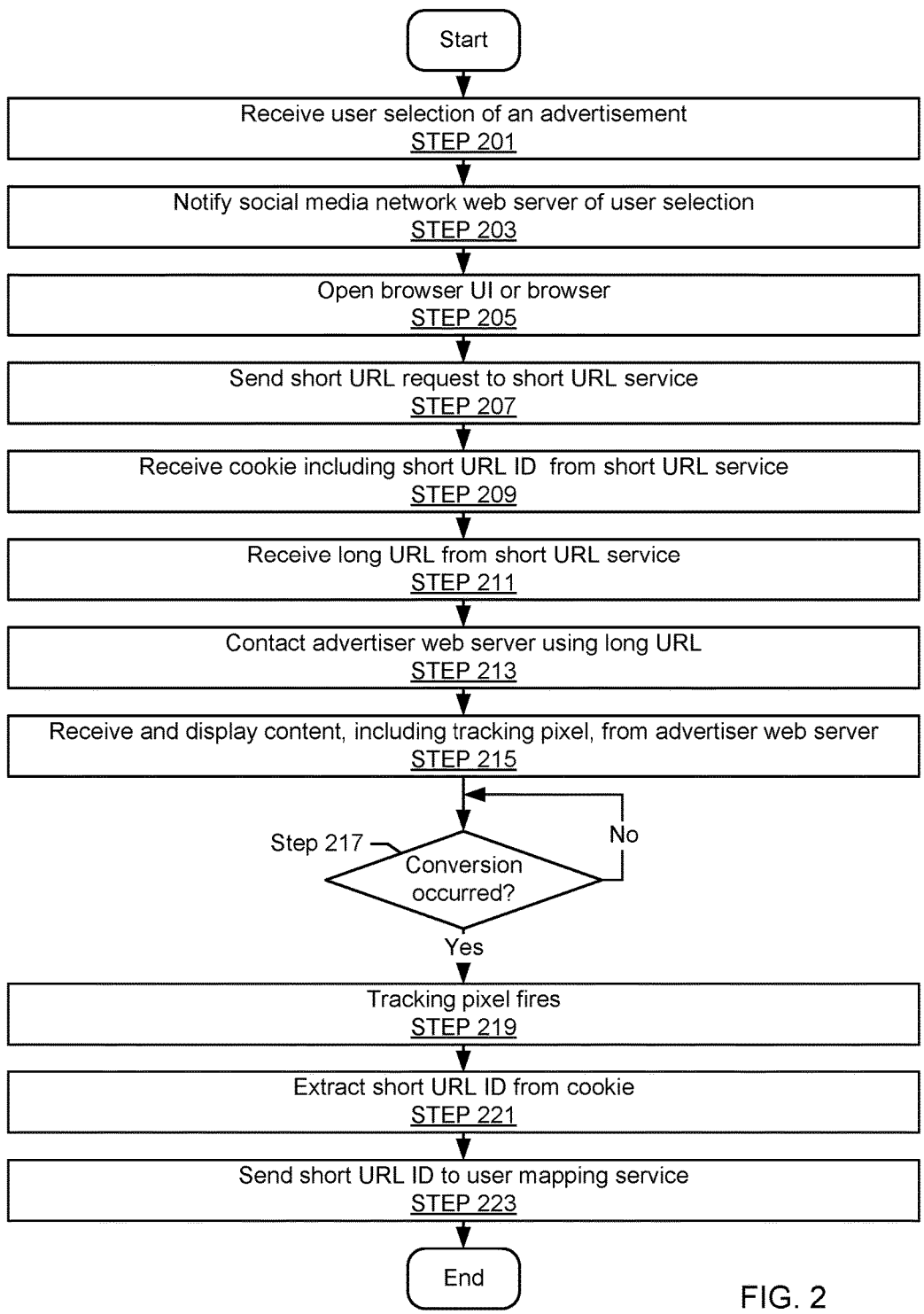
FIGS. 2-6 show methods in accordance with a first embodiment of the invention.

In one or more embodiments of the invention, the portable device (101) is a tablet computer, an electronic reader (e-reader), a cable box, a kiosk, a smart phone, a personal digital assistant (PDA), or any other type of hardware device capable of executing at least one of the steps shown in FIG. 2. The portable device (101) may include a processor, persistent storage, and memory to execute an application (103) and/or a browser (105). Further, the portable device (101) includes functionality to communicate with one or more of the other components in the system using any form of wired and/or wireless communication.

In one or more embodiments of the invention, the application (103) is a software application of any type (e.g., a messaging application, a social media application, a game, etc.). In one embodiment of the invention, the application is a stand-alone application that does not require a browser for its execution. The application may further not support cookies.

The application (103) may include an application user interface (UI) (103A) that enables a user to interact with the application by providing content to the user and by accepting input from the user. In one embodiment of the invention, the application UI displays an advertisement(s).

In one embodiment of the invention, the application further includes a browser user interface (UI) (103B). The browser UI may provide an interface within the application that may enable the application to support web technologies including, for example, HyperText Markup Language (HTML), JavaScript, Cascading Style Sheets (CSS), etc.

The browser UI (103B) may be used to execute web content, received in response to, for example, clicking the advertisement displayed in the application UI (103A). The browser UI (103B) may be based on webview technology, e.g., iOS® or Android™ webview.

In one embodiment of the invention, a browser (105) executes on the portable device (101). Analogous to the browser UI (103B), the browser (105) may be used to execute web content, received in response to clicking the advertisement displayed in the application UI (103A). However, unlike the browser UI (103B) which is integrated in the application (103), the browser (105) is separate from the application (103). The browser (105) may be used in scenarios where the application does not provide a browser UI. If both a browser and a browser UI are available, a configuration parameter may determine whether the browser and/or the browser UI is used.

In one or more embodiments of the invention, one or more advertisements or other external content, i.e., non-application content, is placed into the application. An advertisement placement may be a predefined space in the application UI (103A) used to display one or more native or non-native online advertisements. For example, the advertisement placement may be at a specific location within the user interface of the application. In another example, the advertisement placement may be associated with a feature in the application, e.g., with a news feed, a message feed, or a stream. In one embodiment of the invention, the stream is a presentation of, list of, or other organization of content within the application UI (103A). The stream may include both content and ads (which may include native ads).

In one or more embodiments of the invention, the short URL service (107) is a server that enables the use of short aliases for redirection of long URLs. The short URL service (107) may be implemented on a computing device similar to the computing system shown in FIG. 8. The short URL service (107) may or may not be separate from the social media network web server (113) and may or may not be separate from the user mapping service (109). The short URL service (107) may shorten protocols including, but not limited to, HTTP, HTTPS, FTP, FTPS, MAILTO, MMS, RTMP, RTMPT, ED2K, POP, IMAP, NNTP, NEWS, LDAP, GOPHER, DICT, and DNS. In one embodiment of the invention, the short URL service (107) adds a unique alias (e.g., a short URL ID) in its database for every advertisement and establishes a short URL that corresponds to a long URL associated with the advertisement. When the short URL service (107) is contacted by another computing device, e.g., by the portable device, with a request that includes a short URL, the short URL service may resolve the long URL corresponding to the short URL and may return the long URL.

In one or more embodiments of the invention, the short URL service (107) further records parameters including, but not limited to, a timestamp of when another computing device contacted the short URL service (107), the Internet protocol (IP) address of the computing device from which the request to access the short URL was made, the operating system of the computing device from which the request was made and/or the short URL included in the request. The aforementioned parameters, along with the short URL ID may be saved as a short URL descriptor. The short URL service (107) may store many such short URL descriptors for later retrieval.

In one embodiment of the invention, the short URL service (107) is configured to communicate, directly or indirectly, with the portable device (101), the user mapping service (109), and the third-party advertisement system (111).

In one or more embodiments of the invention, the social media network web server (113) is configured to allow an application (103) executing on a portable device (101) to interface with the social media network web server, for example, in order to receive and store user-provided content from the application and/or to provide content, stored on the social media network web server or elsewhere, to the user accessing the application. Further, the social media network web server may support similar interactions via the browser (105). Accordingly, users may interact with a social network (e.g., Twitter), via either a portable device application, or via a browser-based web page that connects to the social media network web server.

Figure 8:
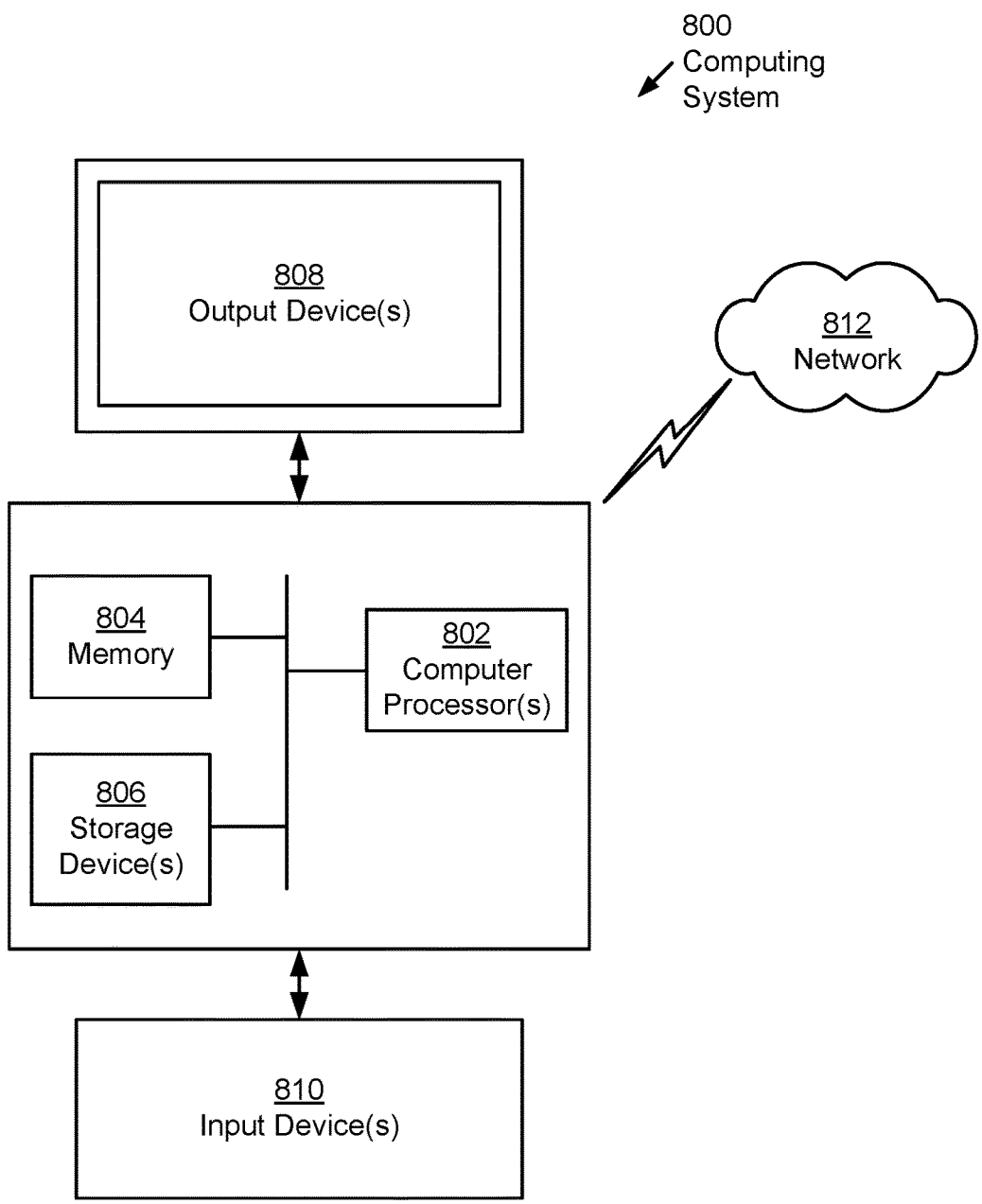
FIG. 8 shows a computing system in accordance with one or more embodiments of the technology.

The social media network web server (113) may be implemented on a computing device similar to the computing system shown in FIG. 8. The social media network web server (113) may be configured to communicate, directly or indirectly, with the portable device (101) and the user mapping service (109).

In one embodiment of the invention, the social media network web server (113) is configured to receive and store information associated with an access of the application (103), an access of the application UI (103A), an access of the browser UI (103B) and/or an access of the browser (105). Information may include, but is not limited to, an IP address of the device used for the access, a timestamp associated with the access, a user ID associated with the access, a device ID associated with the portable device (101) accessing the application (103), an operating system of the portable device, etc. In one embodiment of the invention, some or all of this information, captured by the social media network web server is provided to the user mapping service (109).

In one or more embodiments of the invention, the user mapping service (109) may include functionality to receive from, and/or deliver information to, the portable device (101), the short URL service (107) and/or the social media network web server (113). The user mapping service (109) may receive and store information associated with the application (103), the application UI (103A), the browser UI (103B), and/or the browser (105) attempting to access content, e.g. external (non-social network) content such as an advertisement. This information may include, but is not limited to, the IP address of the portable device (101) used for the access, a timestamp associated with the access, the operating system of the portable device, the social media ID (e.g. a login name) of the user making the access request, a portable device ID, etc. Those skilled in the art will recognize that the gathered information is not limited to the above identifiers. Rather, any type of information that may be employed for the identification of a user and/or device used for accessing content may be stored.

The user mapping service (109) may be implemented on a computing device similar to the computing system shown in FIG. 8. The user mapping service (109) may or may not be separate from the social media network web server (113) and may or may not be separate from the short URL service (107). The user mapping service (109) may be configured to communicate, directly or indirectly, with the device (101), the short URL service (107), and the social media network web server (113).

The user mapping service (109) may also be capable of directly retrieving information including, for example, the short URL address (also referred to as a short URL), the IP address used to access the advertiser web server (115), the timestamp associated with the access, the operating system used for the access, the social media ID associated with the access, a partner user ID of the user associated with the access, personal information (e.g., phone number, electronic mail address, facsimile number, physical mailing address, etc.) associated with the partner ID, etc.

In one or more embodiments of the invention, the aforementioned information obtained by the user mapping service (109) may be stored in accordance with current privacy and/or data protection requirements.

Having communicated with both the short URL service (107) and the social media network server (113), the user mapping service (109), in accordance with an embodiment of the invention, possesses two sets of information and creates mappings between these sets of information when certain conditions are met. The first set information is summarized in a social media descriptor and the second set of information is summarized in a short URL descriptor. These sets of information are subsequently described in FIG. 1B.

In one embodiment of the invention, the user mapping service (109) may store or may have access to many social media descriptors and many short URL descriptors. The user mapping service, in accordance with an embodiment of the invention, determines mappings between corresponding social media descriptors and short URL descriptors on the basis of a match between content in the two descriptors. The resulting mappings may be used to identify related events. These related events may thus be uniquely attributed to a particular social media ID. For example, the mapping may enable causality between an advertisement shown to a user having a particular social media ID in the application (103), and a purchase subsequently made by the user in the browser (105) to be established, even though the browser (105) and the application (103) are independent from one another. Specifically, even as the user interacts with the advertisement in the application (103) and is redirected to a page by the advertiser web server (115), which is outside the application UI (103 A), the application (103) can still be credited with displaying an effective advertisement.

The mapping, determined by the user mapping service may thus help quantify the effectiveness of an online advertisement. Details of using the mappings to attribute conversions to online advertisements, in accordance with one or more embodiments, are described in FIGS. 2-7.

The advertiser web server (115), in accordance with an embodiment of the invention, stores the advertisement content (or other external content) to be presented to the user of the application (103) on the portable device (101) upon selection by the user. The advertisement content may be any type of visual and/or audio content and further may include options to interact with the content. For example, the content may include a purchasing interface, enabling the user to select, view and purchase an advertised product. In one embodiment of the invention, the advertiser web server (115) may be reached using a long URL address (as referred to as a long URL). This long URL address may not be initially available on the portable device, upon selection of the advertisement. Instead, selection of the advertisement results in the portable device using a short URL to contact the short URL service (107). The short URL service (107), in response, may provide the long URL, thus enabling the portable device to reach the advertiser web server (115).

In one or more embodiments of the invention, the third-party advertisement system (111) may include an advertisement network, a partner, and an advertisement server system. In one or more embodiments of the invention, the advertisement network, the partner, and the advertisement server system work in congruence to facilitate the fulfillment of native or non-native advertisements in the application (103) using, e.g., a real-time bidding (RTB). Technical details pertaining to how advertisements are populated, bid, and fulfilled are omitted for the sake of brevity.

While FIG. 1A shows a system in accordance with one or more embodiments of the invention, the architecture of the system is not limited to the components shown in FIG. 1A. Those skilled in the art will recognize that the system may, for example, include additional servers. For example, there may not be a single social media network web server. Instead, multiple servers may be necessary to support a large user base. Further, various functionalities that are separately described may be combined on a single server. For example, the short URL service and the user mapping service may execute on the same server. Also, the components of the system, including the portable device (101), the short URL service (107), the user mapping service (109), the third-party advertisement system (111), the social media network web server (113) and the advertiser web server (115) may communicate using any combination of wired and/or wireless communication protocols. The network used to connect the above components may include wide area network segments (e.g., the Internet), and/or a local area network segments (e.g. enterprise or home networks). The communication between the components may include any combination of secured (e.g., encrypted) and non-secure (e.g., un-encrypted) communication. The manner in which the components communicate may vary based on the implementation of the invention.

Figure 1B:
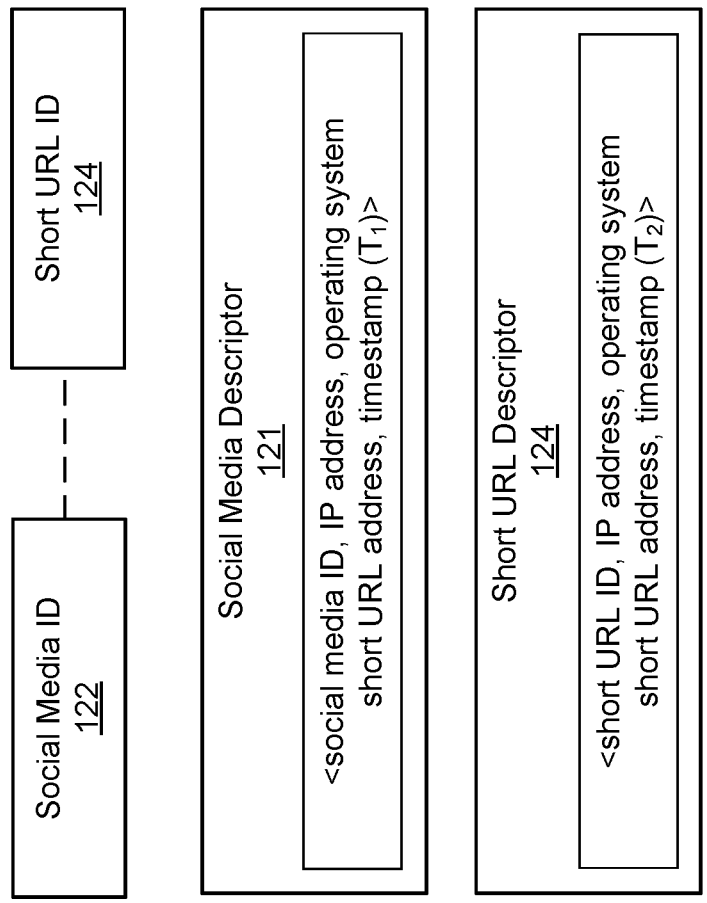
FIG. 1B shows descriptors in accordance with one or more embodiments of the invention.

FIG. 1B shows the relationship between various components in accordance with one or more embodiments of the invention. As shown in FIG. 1B and further described in FIGS. 5-6, the user mapping service using includes functionality to generate a mapping between the social media ID (122) and a short URL ID (124) using a social media descriptor (121) and a short URL descriptor (123). More specifically, FIG. 1B shows the various types of information that may be included in the descriptors (121, 123), stored by the user mapping service (109). These descriptors, in accordance with an embodiment of the invention, are generated whenever a user accesses an advertisement (or other external content) displayed in an application (103), as described in detail below. The social media descriptor (121) may be generated by the social media network web server (113), whereas the short URL descriptor (123) may be generated by the short URL service (107). Both descriptors (121, 123) may be stored by the user mapping service (109). Those skilled in the art will recognize that many descriptors (121, 123) may coexist simultaneously, in particular for large social media networks where many users interact with the social media application and may select external content (e.g. applications) while using the social media application.

The information described below may be stored in one or more data structures. Any data structure type (e.g., arrays, linked lists, hash tables, etc.) may be used to store the descriptors (121, 123) and the information in the descriptors and to maintain relationships (as described below) between corresponding social media descriptors (121) and short URL descriptors (123). The user mapping service (109), in accordance with one or more embodiments of the invention, establishes and maintains mappings between social media IDs (122) and the short URL IDs (124).

The social media descriptor (121) may include the IP address of the portable device (101) executing the application (103), the operating system of the portable device, the short URL to an advertisement selected by the user, and a timestamp generated by the social media network web server. The social media descriptor (121) may further include a social media ID, e.g., a user name associated with a social media network, including but not limited to, Twitter. The user name may be the login name of the user accessing the application on the portable device. The social media descriptor may be generated by the social media network web server. The social media descriptor may include additional and/or other information without departing from the invention.

The short URL descriptor (123) may include the IP address of the portable device (101) executing the application (103), the operating system of the portable device, the short URL to an advertisement selected by the user, and a timestamp generated by the short URL service. Further, a short URL ID, i.e., a unique identifier (typically including numbers and alphabets) may be included in the short URL descriptor (123). The short URL descriptor may include additional and/or other information without departing from the invention.

A mapping between a particular social media ID and a particular short URL ID may be established based on a comparison of the social media descriptor (121) and the short URL descriptor (123). Once such a mapping has been established, it may be used for online conversion attribution, i.e., to prove that a particular activity (e.g., a purchase of a product, viewing of an advertisement, etc.) by a user, affiliated with the social media ID stored in the social media descriptor, is causally related to the user initially accessing an advertisement of the product (or other external content) via the social network that the user is accessing, as described below with reference to FIGS. 2-7.

FIGS. 2-6 show methods for online conversion attribution, in accordance with a first embodiment of the invention. FIG. 2 describes steps performed by the portable device, FIG. 3 describes steps performed by the short URL service, FIG. 4 describes steps performed by the social media network web server and FIGS. 5 and 6 describe steps performed by the user mapping service. The execution of the method described in FIGS. 2-6 may be triggered by a user selecting an advertisement (or other external content) in an application, e.g. in a social media application.

While the various steps in the flowcharts are presented and described sequentially, one of ordinary skill will appreciate that some or all of these steps may be executed in different orders, may be combined or omitted, and some or all of the steps may be executed in parallel. In one embodiment of the invention, the steps shown in FIGS. 2-6 may be performed in parallel with any other steps shown in FIGS. 2-6 without departing from the invention.

FIG. 2 shows a method in accordance with one or more embodiments of the invention, performed by the portable device. More specifically, FIG. 2 relates to a scenario in which a user is accessing an application executing on the portable device and, within the application, selects an advertisement (or other external content), for example, by clicking on a link displayed by the application user interface. Selection of the advertisement triggers the execution of the method of FIG. 2, and may subsequently also invoke other steps described in FIGS. 3-6.

In Step 201, a user selection is received by the application executing on the portable device. The user selection may be, for example, a link to an advertisement, clicked by the user. The link, in accordance with an embodiment of the invention, is a short URL that may not directly point to the advertisement, but instead may need to be resolved by the short URL service in order to obtain the long URL that points to the advertisement. The advertisement may be displayed in the application.

In Step 203, the application notifies the social media network web server of the user selection. The notification may include the short URL, the IP address of the portable device and/or the operating system of the portable device.

In Step 205, a browser user interface (UI) or a browser is opened on the portable device.

In Step 207, the browser UI or the browser sends a short URL request to the short URL service. The request may be, for example an HTTP GET request based on the short URL. The request may include the short URL, the IP address of the portable device and/or the operating system of the portable device.

In Step 209, a cookie, sent by the short URL service, is received by the browser UI or by the browser. The cookie, returned by the URL service in response to the request made in Step 207, may include a short URL ID. As previously described, the short URL ID may have been generated by the short URL service and may have been included in a short URL descriptor. The generation of the short URL descriptor is described in Step 305 of FIG. 3.

In Step 211, the long URL, sent by the short URL service, is received by the browser UI or by the browser. The long URL, in accordance with an embodiment of the invention, is the URL to be used to reach the advertisement on the advertiser web server.

In Step 213, the browser UI or the browser contacts the advertiser web server using the long URL in order to obtain the advertisement content.

In Step 215, the advertisement content, provided by the advertiser web server, is received by the browser or the browser UI. In one embodiment of the invention, the content includes a tracking pixel. The tracking pixel may be an element that, after detection of a particular user activity, signals that the user activity has occurred. Specifically, the tracking pixel may be used to signal the detection of a conversion. A conversion may occur, for example, when a user purchases the advertised product, when a specified web page is accessed, when the user lands on an order confirmation page, when the user submit a certain form, etc. Those skilled in the art will recognize that what constitutes a conversion may be configurable.

The tracking pixel may be, for example, a segment of HTML, JavaScript or any other type of browser-executable code, etc. that executes once the conversion is detected. In one embodiment of the invention, the tracking pixel includes code that, when the tracking pixel fires, i.e., when the tracking pixel code is executed, extracts the short URL ID from the cookie obtained in Step 209, and sends the short URL ID to the user mapping service. Alternatively, or in addition, the tracking pixel may include information including, but not limited to, sales amounts, order quantities, order IDs, or a combination thereof. In accordance with one or more embodiments of the invention, a partner (e.g., the entity that is attempting to send customers to its website using advertisements) may weigh the one or more of various factors and compute a value of a conversion. Thus, not all conversions are necessarily equal. In particular, a partner may want to identify highly valuable users who convert upon interacting with the advertisement. The additional information in the tracking pixel gives the partner the ability to assign a value to a conversion that is reflective of the value that the user has to the partner.

In one embodiment of the invention, the tracking pixel may be implemented by modifying an HTML file of the advertiser webpage. A non-limiting example of HTML that may be added to the HTML file is shown below.

```
<script src="//platform.twitter.com/oct.js" type="text/javascript"></script>
<script type="text/javascript">
twttr.conversion.attributionPid('14jtt', {tw_sale_amount: 0, tw_order_quantity: 0});</script>
<noscript>
<img height="1" width="1" style="display:none;" alt=" " src="https://analytics.twitter.com/i/adsct?txn_id=14jtt&p_id=Twitter&tw_sale_amount=0&tw_or der_quantity=0"/>
<img height="1" width="1" style="display:none;" alt=" " src="//t.co/i/adsct?txn_id=14jtt&p_id=Twitter&tw_sale_amount=0&tw_order_quantity=0"/></noscript>
```

In Step 217, a determination is made about whether a conversion has occurred. The execution of any subsequent steps may be delayed until a conversion is detected. Once the conversion is detected, based on the specified conversion criteria, the method may proceed to Step 219.

In Step 219, the tracking pixel fires. As the tracking pixel code is executed, in Step 221, the short URL ID is extracted from the cookie received in Step 209, and, in Step 223, the extracted short URL ID is sent (directly or indirectly) to the user mapping service. In one embodiment of the invention, the short URL ID extracted from the cookie may be sent to another component and/or service in the system, where this component and/or service subsequently sends the short URL ID to the user mapping service.

Figure 5:
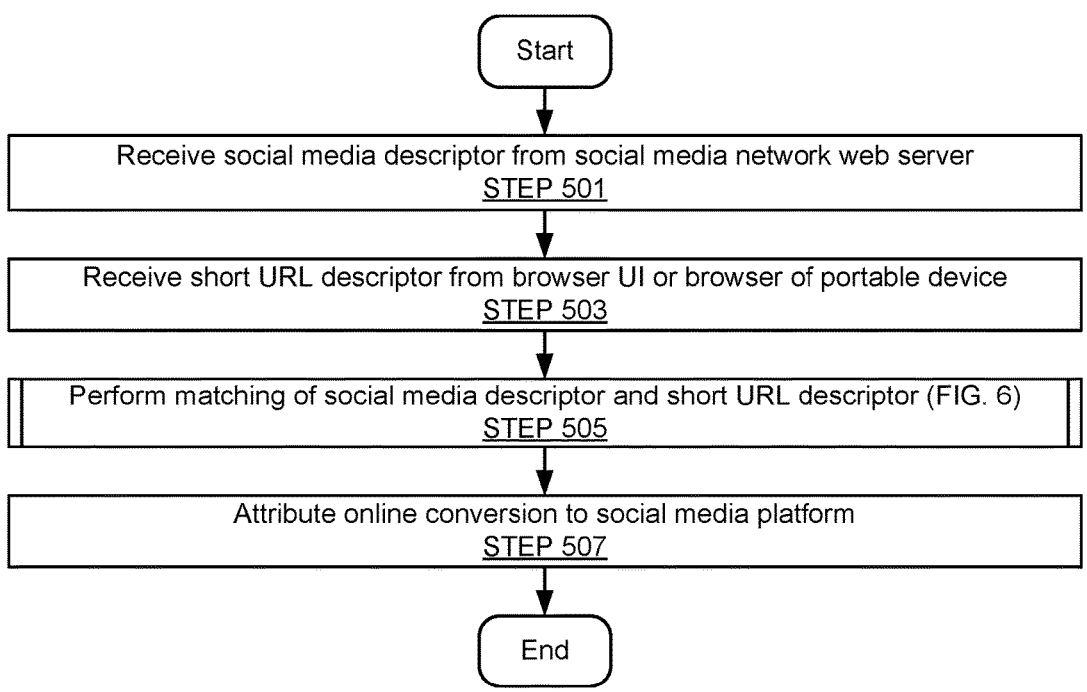

In another embodiment of the invention, the short URL ID is sent to the component or service that performs the online conversion attribution, where the component or service is not the user mapping service (see e.g., FIG. 5, step 507).

Figure 3:
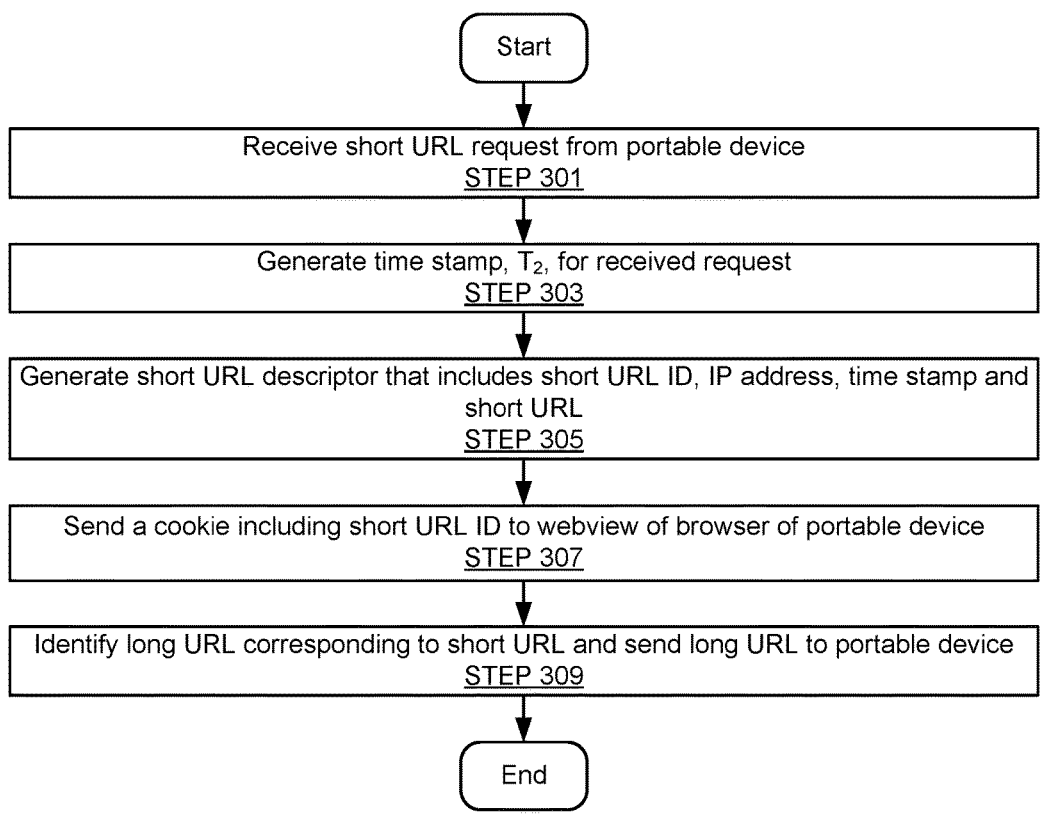

FIG. 3 shows a method in accordance with one or more embodiments of the invention, performed by the short URL service.

In Step 301, the short URL request, sent by the portable device in Step 207, is received. The received short URL request may include the short URL to be resolved and may also include additional information such as the IP address of the portable device and the operating system of the portable device.

In Step 303, a timestamp, $T_2$, is generated for the received request. The timestamp indicates the time when the request was received by the short URL service.

In Step 305, the short URL descriptor is generated. The short URL descriptor may include the short URL ID generated for the received short URL request, the IP address of the portable device, the operating system of the portable device, the timestamp, $T_2$, and/or the short URL.

In Step 307, a cookie that includes the short URL ID is generated and sent to the browser user interface (UI) or the browser that was opened on the portable device in Step 205.

In Step 309, the long URL that corresponds to the short URL is identified, and the identified long URL is sent to the portable device.

Figure 4:
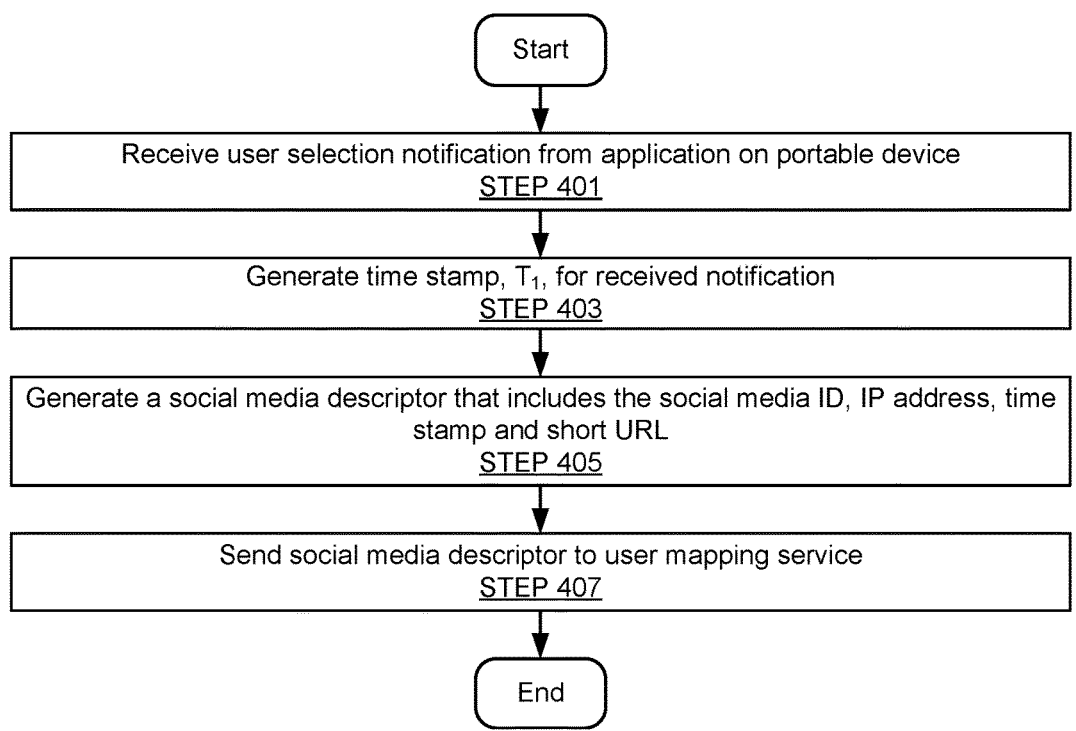

FIG. 4 shows a method in accordance with one or more embodiments of the invention, performed by the social media network web server.

In Step 401, the user selection notification, sent from the portable device in Step 203, is received.

In Step 403, a timestamp, $T_1$, is generated for the received notification. The timestamp, $T_1$, indicates the time when the notification was received by the social media network web server. In one embodiment of the invention, the time base used for timestamping by the social media network web server is at least periodically synchronized with the time base used for timestamping by the short URL service.

In Step 405, a social media descriptor is generated that may include the social media ID, the IP address of the portable device, the operating system of the portable device, the timestamp, $T_1$, and/or the short URL.

In Step 407, the social media descriptor is sent to the user mapping service.

FIG. 5 shows a method in accordance with one or more embodiments of the invention, performed by the user mapping service.

In Step 501, the social media descriptor, sent by the social media network web server in Step 407, is received. The received social media descriptor may be stored by the user mapping service, along with other, previously received social media descriptors.

In Step 503, the short URL descriptor, sent by the browser UI or browser of the portable device in Step 223, is received. The received short URL descriptor may be stored by the user mapping service, along with other, previously received short URL descriptors.

In Step 505, matching social media and short URL descriptors are identified. The result of step 505 maybe one or more mappings between social media IDs and short URL IDs. The details of Step 505 are described in FIG. 6

In Step 507, when a short URL ID is received by the user mapping service (e.g., as a result of steps 217-223 being performed), the short URL ID is compared to the mappings generated in step 505. If there is a match, then the online conversion is attributed to the social media platform. In one embodiment of the invention, the short URL ID that is received in response to steps 217-223 being performed is associated with a timestamp ($T_3$). In such scenarios, attribution may only occur if there is a match between the short URL ID and a social media ID and if the difference between: (i) $T_3$ and $T_1$ or (ii) $T_3$ and $T_2$ is less than a predetermined amount of time (e.g., 30 minutes, 1 hour, 5 hours, 1 day, etc.) Attribution may take many forms including, for, example, providing monetary compensation to social media platform for every pixel that fires.

In one embodiment of the invention, steps 505 and 507 may be performed in real-time or near real-time (e.g., in close temporal proximity to the time that: (i) the social media descriptor is generated, (ii) the short URL descriptor is generated; and (iii) the short URL ID is received by the user mapping service). In another embodiment of the invention, the user mapping services may obtain social media descriptors, the short URL descriptors, and the short URL IDs for a period of time (e.g., one hour, one day, once week, etc.) and then perform steps 505 and 507.

In one embodiment of the invention, a component or service other than the user mapping service may perform all or a portion of step 507. More specifically, the user mapping service may provide the mappings generated in step 505 to another component or system. This component and/or service may also obtain from directly or indirectly the short URL ID generated as a result of step 217-223 being performed.

Figure 6:
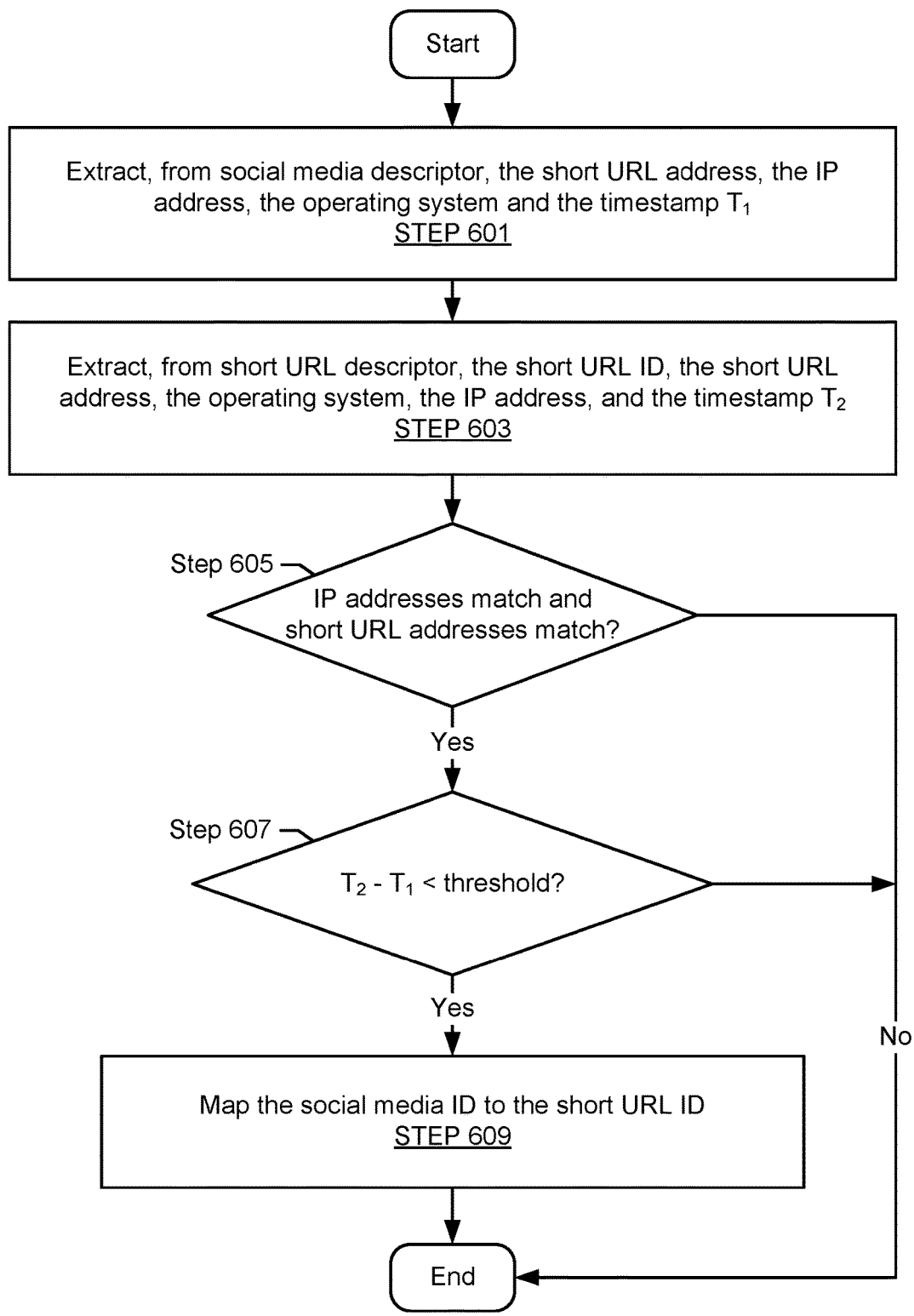

FIG. 6 shows a method for matching a social media descriptor with a short URL descriptor, in accordance with one or more embodiments of the invention. The method may be performed, for example, after receipt of the short URL descriptor. The method may be re-executed to match the short URL descriptor with stored social media descriptors until a matching media descriptor is identified.

In Step 601, a social media descriptor is obtained. The obtained social media descriptor may be the most recently received social media descriptors (Step 501). The social media descriptor may include but is not limited to, the social media ID, the short URL address, the portable device IP address, the portable device operating system and/or the timestamp, $T_1$, associated with a user interacting with the advertisement (see e.g., Step 403).

In Step 603, a short URL descriptor is obtained. The obtained short URL descriptor may be the most recently received short URL descriptor (Step 503). The short URL descriptor may include, but is not limited to, a short URL address, a portable device IP address, a portable device operating system and/or a timestamp, $T_2$, associated with a user interacting with the advertisement (see e.g., Step 303).

In Step 605, a determination is made about whether the entries of the short URL descriptor match with the entries of the social media descriptor. In order to make this determination, for example, IP addresses, short URL addresses, operating systems, or combinations thereof may be compared. If a match is detected, it is assumed that the social media descriptor and the short URL descriptor originate from the same user and/or portable device, and the method may proceed to Step 607. If no match is detected, execution of the method may terminate, and subsequently another pair of short URL and social media descriptors may be analyzed in another execution of the method shown in FIG. 6.

In Step 607, a determination is made about whether the timestamps, $T_1$ and $T_2$, were created within a short time interval. A short time interval may indicate that both timestamps were a result of a single user activity, whereas a longer time interval may suggest that the timestamps are not attributed to the same user activity. If the difference between $T_1$ and $T_2$ is below a predetermined threshold, the method may proceed to Step 609. If the difference between $T_1$ and $T_2$ is above the predetermined threshold, the execution of the method may terminate, and subsequently another pair of short URL and social media descriptor may be analyzed in another execution of the method shown in FIG. 6.

In Step 609, the social media ID is mapped to the short URL ID, thus unambiguously affiliating the user and/or the social network with the user activity that resulted in the conversion.

Example 1

The use case scenario described below is intended to provide an example of the method for online conversion attribution, described in FIGS. 2-6. The use case scenario is based on the exemplary system shown in FIG. 1A and is for illustrative purposes only. The methods described by FIGS. 2-6 are limited to neither the system shown in FIG. 1A, nor to the use case scenario below.

Consider a scenario in which Kevin is using a smartphone to execute an application. As Kevin browses content and advertisements in the application via an application UI, he encounters an advertisement from a partner, a sportswear company. Kevin interacts with the advertisement by clicking on a link (i.e., a short URL, e.g., "www.t.co/sports") in the advertisement.

Selecting the link results in the following information being transmitted to the social media network web server: Kevin's social media ID, the IP address of Kevin's smartphone and the short URL, "www.t.co/sports". A timestamp is generated by the social media network server.

In addition, selection of the link also opens a webview (browser user interface) in the application. The application, via the webview, subsequently, sends an HTTP GET request to "www.t.co/sports". Upon receipt of the request, the t.co server (i.e., the short URL service in this example) generates a short URL descriptor that stores the following information: the short URL ID, the IP address of Kevin's smartphone, "www.t.co/sports", and a timestamp, generated by the short URL service. The t.co server subsequently sends the short URL ID to the application executing on Kevin's smartphone. In addition, the t.co server also provides the long URL (e.g., "www.sportsco.com/homepage/basketball") to the webview.

The webview subsequently sends an HTTP GET request to "www.sportsco.com/homepage/basketball", which results in the sportswear company webpage being displayed in the webview. At some later point in time, a pixel on the webpage fires that results in the short URL ID being sent to the user mapping service. Based on the short URL ID, the user mapping service picks the corresponding short URL descriptor and identifies the matching social media descriptor. Using the short URL descriptor and the matching social media descriptor, a correspondence is established between Kevin's social media ID and the short URL ID, thus confirming that Kevin, by clicking on the advertisement in the social media application was redirected to the sportswear company This finding may then be used to quantitatively assess the effectiveness of the advertisement in the application and/or attribute the conversion to application accordingly.

Figure 7:
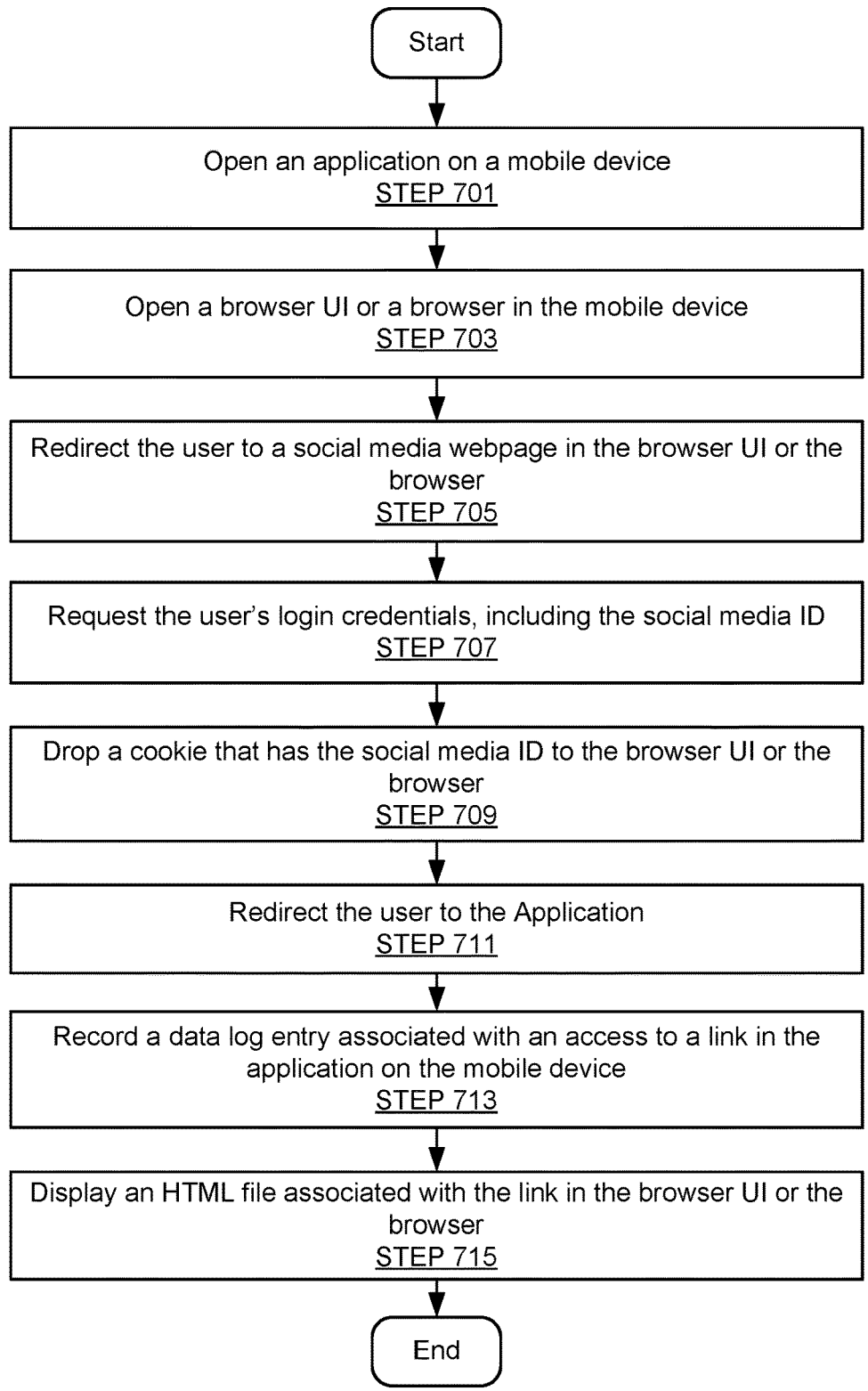
FIG. 7 shows methods in accordance with a second embodiment of the invention.

FIG. 7 shows a method in accordance with a second embodiment of the invention. While the various steps in the flowchart are presented and described sequentially, one of ordinary skill will appreciate that some or all of the steps can be executed in different orders and some or all of the steps can be executed in parallel. Further, in one or more embodiments of the invention, one or more of the steps can be omitted, repeated, and/or performed in a different order. Accordingly, the specific arrangement of steps shown in FIG. 7 should not be construed as limiting the scope of the invention. In Step 701, the user executes an application on a portable device.

At some point after the application has been executed, in Step 703, a browser UI or a browser is opened in the portable device. In one embodiment of the invention, the initial opening of the application may trigger Step 703.

In Step 705, the user is directed from the application UI in the application to a social media webpage associated with the application in either the browser UI or the browser. The social media webpage may be accessed via the social media network web server. The browser UI may be based on webview technology, e.g., iOS® or Android™ webview.

In Step 707, the social media webpage requests that the user input his or her login credentials including, but not limited to, a social media ID, a password associated with the social media ID, a Completely Automated Public Turing test to tell Computers and Humans Apart (CAPTCHA), a security answer to a security question, or the like. The information provided to the social media webpage in Step 707 may be the same or substantially the same information that the user is required to provide to when initially opening the application.

In step 709, the social media network web server may (after a user has successfully logged in using the credentials provided in Step 707) provide a cookie to the browser UI or the browser, where the cookie includes the social media ID of the user.

In step 711, the user is redirected back to the application UI in the application.

In Step 713, when the user interacts (as discussed above) with an advertisement in the application, a data log entry is recorded. The data log entry includes information including, but not limited to, a social media ID, an IP address, a timestamp associated with the interaction between the user and the advertisement.

In Step 715, the browser UI or the browser, in response to the interaction in Step 713, obtains and displays a webpage based on the obtained HTML file.

At time after Step 715, as the user interacts the webpage (i.e., the webpage obtained in Step 715), information in the cookie (i.e., the cookie generated and stored in Step 709) may be provided (directly or indirectly) to the social media network web server. This information may then be used for attribution, e.g., as described in Step 507 of FIG. 5.

The following description includes a set of non-limiting examples that describe various aspects of one or more embodiments of the invention.

Example 2

Kevin is using a smartphone to execute an application. When Kevin opens the application, he is redirected to a social media webpage in the webview (as discussed above) where the webview displays a login page for a social media network. Kevin is requested to input his credentials, including his social media ID (121) and password. When Kevin's identification is authenticated, a cookie possessing Kevin's social media ID is sent to the application and associated with the webview. At some time after the cookie is obtained, Kevin is redirected back to the Application UI (i.e., user interface of the application and not the webview).

Subsequently, when Kevin interacts with an advertisement within the application UI (e.g., a sportswear company advertisement from the above example), Kevin's social media ID, IP address, and a timestamp associated with Kevin's interaction with the advertisement are recorded and forwarded to a social media network web server, which is associated with the application. In this example, the advertisement includes the full URL (e.g., www.sportsco.com/homepage/basketball) and, as such Kevin is able to directly access the website of the sportswear company.

At some later point in time, a pixel on the webpage fires, which results in the social media ID being sent to the social network web server. The information captured by the social network web server may be used quantitatively assess the effectiveness of the advertisement in the application and/or attribute the conversion to the application accordingly.

Example 3

Kevin is a gold member with a partner, a sportswear company. Purchase conversions made by gold members with the partner are valued at three times those made by regular members. When Kevin interacts with an advertisement for the sportswear company by using the method in either Example 1 or Example 2, Kevin lands at a sportswear company page. When Kevin lands at the sportswear company page, a first pixel fires and Kevin's conversion is assigned 1 point. When Kevin makes a purchase and arrives at an order confirmation page, a second pixel having Kevin's gold member identifier is fired and Kevin's conversion is assigned 3 points. Kevin's gold member identifier may be the header "G" associated with the order confirmation number, e.g., G0123456789. In total, Kevin's conversion is assigned 4 points.

On the other hand, Sam, who is a regular member with the sportswear company, is assigned 1 point for firing the first pixel and assigned 1 more point for firing the second pixel. Sam's regular member identifier may be the header "R" associated with the order confirmation number, e.g., R9876543210, or simply the absence of the header "G," e.g., 9876543210. In total, Sam's conversion is assigned 2 points.

The use of the tracking pixels may enable various entities to obtain more granular information about how users are interacting with a given website.

The above-examples are not intended to limit the scope of the invention. One of ordinary skill in the art with the benefit of the detailed specification would understand that variations to the invention, including the addition and/or the removal of certain steps, features, components, are possible and fall within the scope of the invention. For example, in Example 3, the assigning of points may be determined by the quantity of items ordered, by the monetary value of items ordered, or a combination thereof.

Further, in addition to attributing conversions and assigning and quantifying values of the conversions, the mapping, as described above, may be used for advertisement retargeting. That is, being able to reconstruct a relationship between a user's social media ID, and the short URL's accessed by the user, a partner may be interested in bidding for advertisement placements in the third-party advertisement system so as to increase the frequency in which the advertisement appears to the user in the application.

Embodiments of the technology may be implemented on a computing system. Any combination of mobile, desktop, server, embedded, or other types of hardware may be used. For example, as shown in FIG. 8, the computing system (800) may include one or more computer processor(s) (802), associated memory (804) (e.g., random access memory (RAM), cache memory, flash memory, etc.), one or more storage device(s) (806) (e.g., a hard disk, an optical drive such as a compact disk (CD) drive or digital versatile disk (DVD) drive, a flash memory stick, etc.), and numerous other elements and functionalities. The computer processor(s) (802) may be an integrated circuit for processing instructions. For example, the computer processor(s) may be one or more cores, or micro-cores of a processor. The computing system (800) may also include one or more input device(s) (810), such as a touchscreen, keyboard, mouse, microphone, touchpad, electronic pen, or any other type of input device. Further, the computing system (800) may include one or more output device(s) (808), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (800) may be connected to a network (812) (e.g., a local area network (LAN), a wide area network (WAN) such as the Internet, mobile network, or any other type of network) via a network interface connection (not shown). The input and output device(s) may be locally or remotely (e.g., via the network (812)) connected to the computer processor(s) (802), memory (804), and storage device(s) (806). Many different types of computing systems exist, and the aforementioned input and output device(s) may take other forms.

Software instructions in the form of computer readable program code to perform embodiments of the technology may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform embodiments of the technology.

Further, one or more elements of the aforementioned computing system (800) may be located at a remote location and connected to the other elements over a network (812). Further, embodiments of the technology may be implemented on a distributed system having a plurality of nodes, where each portion of the technology may be located on a different node within the distributed system. In one embodiment of the technology, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the technology as disclosed herein. Accordingly, the scope of the technology should be limited only by the attached claims.

What is claimed is:

1. A system for conversion attribution, the system comprising:
   at least one computer processor; and
   a memory configured to store instructions that are executable by the at least one computer processor to:
   receive a short uniform resource locator (URL) from a device; and
   in response to receiving a short URL from the device:
      provide a cookie to the device, wherein the cookie includes a short URL identifier (ID) associated with the short URL; and form a short URL descriptor including the short URL ID;
      receive a social media descriptor from the device, the social media descriptor including a social media identifier (ID);
      map the short URL ID to the social media ID using the short URL descriptor and the social media descriptor; and
      attribute, using the mapping, a conversion on a website accessed using the device responsive to receiving the short URL ID from the device, the attribution comprising detecting a causal relationship between a display of an advertisement for the website via the device and the attributed conversion and crediting an application executing on the device with displaying the advertisement.

2. The system of claim 1, wherein the instructions are further executable by the at least one computer processor to provide, to the device, a long URL corresponding to the short URL.

3. The system of claim 1, wherein the short URL descriptor further includes an Internet Protocol (IP) address assigned to the device, the short URL, an operating system executing on the device, and a timestamp.

4. The system of claim 1, wherein the social media descriptor further includes an Internet Protocol (IP) address assigned to the device, the short URL, an operating system executing on the device, and a timestamp.

5. The system of claim 1,
   wherein the short URL descriptor further includes an Internet Protocol (IP) address assigned to the device, the short URL, and a first timestamp, wherein the social media descriptor further includes the IP address assigned to the device, the short URL, and a second timestamp, wherein mapping the short URL ID to the social media ID includes using the IP address assigned to the device and the short URL.

6. The system of claim 5, wherein the instructions are further executable by the computer processor to map the short URL ID to the social media ID using the first timestamp and the second timestamp.

7. The system of claim 1, wherein the short URL ID received from the device is associated with a timestamp, and wherein the instructions are further executable by the computer processor to attribute the conversion based, at least in part, on the timestamp.

8. The system of claim 1, wherein the device is a mobile device.

9. A method for conversion attribution, the method comprising:

obtaining a social media descriptor including a social media identifier (ID), a short uniform resource locator (URL) address, a first timestamp and an Internet Protocol (IP) address assigned to a device;

obtaining a short URL descriptor including a short URL identifier (ID), the short URL address, the IP address assigned to the device, and a second timestamp;

generating, using the social media descriptor and the short URL descriptor, a mapping between the short URL ID and the social media ID; and attributing, using the mapping, a conversion on a partner website in response to detecting an access of the partner website associated with the short URL ID within a predetermined period of time after an advertisement is determined to have been displayed via the device, the attribution comprising detecting a causal relationship between a display of an advertisement for the website via the device and the attributed conversion and crediting an application executing on the device with displaying the advertisement.

10. The method of claim 9, further comprising determining that the application is executing on the device, wherein the social media ID is associated with an account on a social media platform, and wherein the application is associated with the social media platform.

11. The method of claim 10, wherein the short URL address is associated with a full URL address and wherein the advertisement includes the short URL address.

12. The method of claim 10, wherein the social media descriptor is generated in response to a selection of the short URL address in the advertisement, and wherein the advertisement is displayed via the application executing on the device.

13. The method of claim 9, wherein the short URL descriptor is generated after the short URL address is received by a short URL service.

14. The method of claim 9, wherein obtaining the social media descriptor and the short URL descriptor comprise obtaining the social media descriptor and the short URL descriptor from a server associated with the social media platform.

15. The method of claim 9, further comprising assigning the conversion a value based on at least one factor selected from a group consisting of a sales amount, an order quantity, and an order ID.

16. A non-transitory computer readable medium encoded with instructions that, when executed, cause one or more processors to:

obtain a social media descriptor including a social media identifier (ID) associated with a user, a short uniform resource locator (URL) address, a first timestamp and an Internet Protocol (IP) address of a device;

obtain a short URL descriptor including a short URL identifier (ID), the short URL address, the IP address of the device, and a second timestamp;

generate, using the social media descriptor and the short URL descriptor, a mapping between the short URL ID and the social media ID; and attribute, using the mapping, a conversion on a partner website in response to a detection of an access of the partner website associated with the short URL ID within a predetermined period of time after an advertisement is determined to have been displayed via the device, the attribution comprising detecting a causal relationship between a display of an advertisement for the website via the device and the attributed conversion and crediting an application executing on the device with displaying the advertisement.

17. The non-transitory computer readable medium of claim 16, wherein the short URL address is associated with a full URL address and wherein the advertisement includes the short URL address.

18. The non-transitory computer readable medium of claim 16, wherein the social media descriptor is generated in response to a selection of the short URL address in the advertisement, wherein the short URL descriptor is generated after the short URL address is received by a short URL service.

19. The non-transitory computer readable medium of claim 16, further encoded with instructions that, when executed, cause the one or more processors to obtain the social media descriptor and the short URL descriptor from a server associated with the social media platform, wherein the short URL address is associated with a full URL address, wherein the advertisement includes the short URL address, and wherein the social media descriptor is generated when the user selects the short URL address in the advertisement displayed via the application executing on the device.

20. The non-transitory computer readable medium of claim 16, further encoded with instructions that, when executed, cause the one or more processors to assign the conversion is assigned a value based on at least one factor selected from a group consisting of a sales amount, an order quantity, and an order ID.

* * * * *